RUSSELL WALKER
SAUL LISS
INVENTORS

BY Andrew L. Bain
George B. Oujevolk
ATTORNEYS

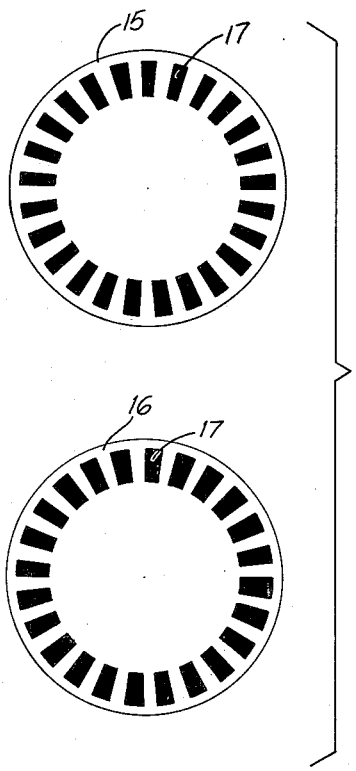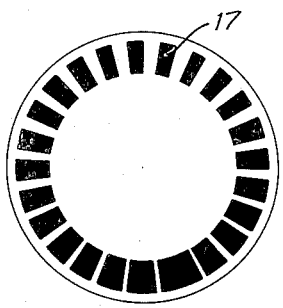

July 18, 1961   R. WALKER ET AL   2,993,200
VERNIER

Filed May 23, 1960   3 Sheets-Sheet 3

RUSSELL WALKER
SAUL LISS
INVENTORS

BY Andrew L. Bain
George B. Oujevolk
ATTORNEYS

United States Patent Office 2,993,200
Patented July 18, 1961

2,993,200
VERNIER
Russell Walker, North Caldwell, and Saul Liss, Fairlawn, N.J., assignors to General Precision, Inc., Little Falls, N.J., a corporation of Delaware
Filed May 23, 1960, Ser. No. 30,972
5 Claims. (Cl. 340—347)

The present invention relates to the measurement of small angular movements of shafts, and more particularly to a vernier adapted to provide a fine angular reading.

Numerous computers and scientific devices depend on the amount of angular rotation of a shaft for their function or operation. However, even the most finely calibrated devices furnish only a rough reading or rough information as to angular measurement. Although many attempts may have been made to provide a device furnishing information in digital form to a resolution of 1 to 2 seconds of arc, none as far as we are aware were successful when carried out into practice in connection with computers and scientific instruments.

It has now been discovered that a takeoff on a coarse indicator can be provided with an ultimate resolution of one second of arc, i.e., better than one part per million so as to make possible the reading of small angles.

Thus, it is an object of the present invention to provide an angle vernier capable of furnishing a fine angular movement.

A further object of the present invention is to provide a rotational speed multiplier to determine the velocity of slow speed shafts without mechanical coupling or loading.

Another object of the present invention is to provide an adjunct to computing devices for transmitting accurate and fine resolution of angle position.

It is also the purpose of the invention to provide a vernier adapted to facilitate certain computer functions, e.g., converting Gray binary numbers to straight binary numbers.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Generally speaking the present invention utilizes as an angle measuring vernier a pair of transparent circular means, e.g., disks or cylinders, one stationary and one rotatable. On each circular means there are a plurality of radially aligned light ray or radient ray impeding sections or bits, said bits being of identical areas and equally spaced apart thus presenting alternating transparent and opaque sections. The circular means are axially aligned so that the bits tend to coincide. However, one of said circular means has $n$ bits and the other circular means has $n$ plus one bits. The utilization of these circular means in carrying out the foregoing objects as well as other objects and the advantages of this arrangement will become apparent from the following description taken in conjunction with the accompanying drawing in which:

FIGURE 2 is a view of the faces of two disks constructed in accordance with the principles of the invention;

FIGURE 3 shows a front view of the two disks superimposed one on the other when mounted on the device depicted in FIGURE 1.

Figure 1:
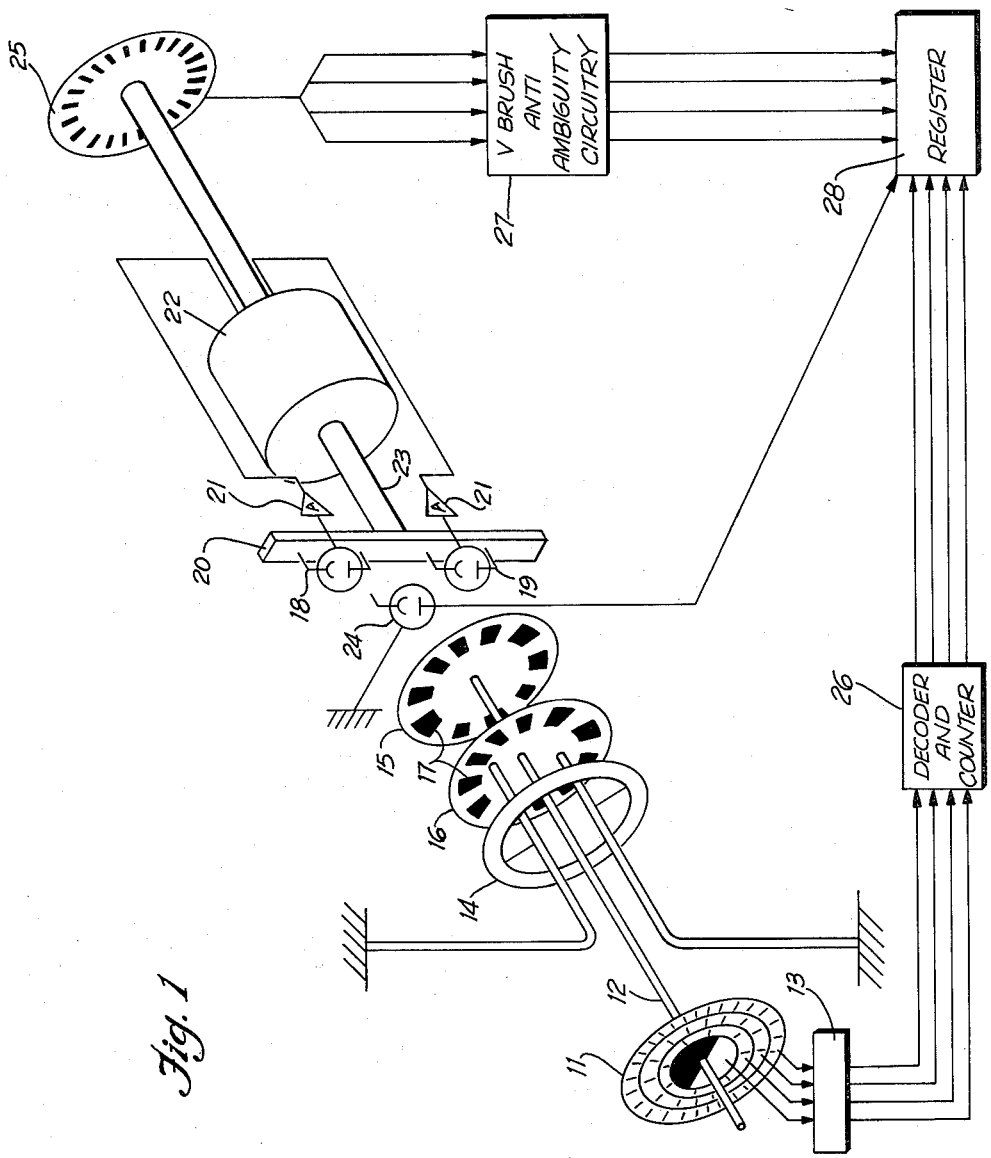
FIGURE 1 is a longitudinal view of a contemplated arrangement which will act as an auxiliary device to a digital disk to permit analogue resolution between the least bit of said digital disk.
Figure 4:
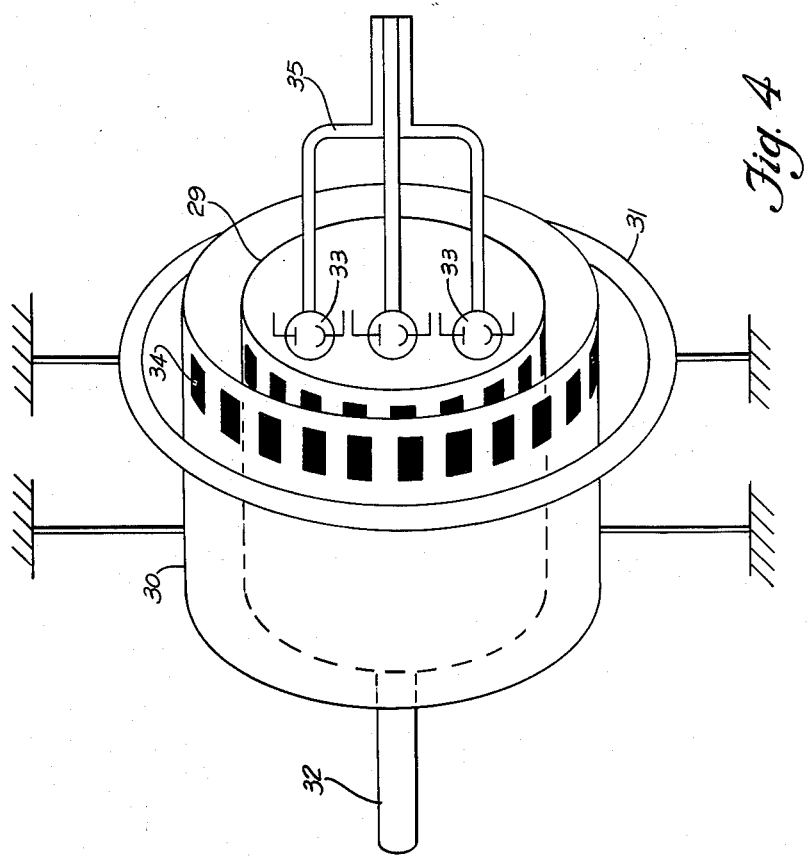
FIGURE 4 depicts two cylinders constructed on the same principles as the two disks illustrated in FIGURES 2 and 3.

The invention will be described as an auxiliary device to a digital disk to permit analogue resolution within the least bit of said digital disk. Once underlying principles of the invention are understood, the application of the invention to other uses and devices will be more readily understood.

There is shown in the drawing a coarse digital encoder disk 11 of a type known in the art, which is mounted on a first shaft 12. This coarse disk might be a "Baldwin" 10-bit BCD cyclic or Gray code wheel. This coarse digital disk has a resolution of $2^{10}$ with an accuracy of $2^{20}$. In conversion from a Gray binary coded decimal to a straight binary coded decimal system, optical pickups are used to determine angular position. Digital information is then provided to a counter.

In addition to the digital code takeoff 13 of coarse disk 11, there is provided a vernier to furnish analogue resolution between the least bit. Past coarse disk 11 and surrounding first shaft 12 on which the coarse disk 11 is mounted is a radiant ray or light source 14. Mounted on shaft 12 is a transparent rotatable circular means, e.g., disk 15, and in proximity to transparent rotatable disk 15 is a transparent stationary circular means, e.g., disk 16, shown in the drawing as being disposed between the light source 14 and rotatable disk 15. However, stationary disk 16 could just as well be placed on the other side of rotatable disk 15. These two disks are precisely on the same cylindrical axis, axially opposed and in parallel planes. The disks appear to be identical. However, they are not. On each disk there are a number of ray impeding opaque markings or bits 17 which in a very finely calibrated disk are merely uniformily spaced radial lines, and on a coarser disk such as shown in the drawing, the markings or bits form a plurality of spherical equilateral identical trapezoidal sections. These bit lines or markings 17 define alternately opaque and transparent areas. However, one of the disks has $n$ bits and the other disk has $n$ plus one bits or markings. The expression "$n$ and $n$ plus one" is of course relative and as used herein is meant to convey the idea that one disk has one more bit than the other, and is meant to convey the same idea as "$n$ and $n$ minus one."

Opposed to the transparent disks are two radiant ray sensing means, e.g., photocells 18 and 19 mounted on an arm 20 at a point before which the bits must pass. The rotation of shaft 12 will cause rotatable disk 15 to turn. As one bit 17 on disk 15 moves to an adjacent space, the matching pattern of $n$ and $n$ plus one bits will create a shadow effect. That is, to the human eye, an optical illusion is created that a shadow races around the disks. This shadow effect is caused by the interference pattern between rotating disk 15 and stationary disk 16. The interference pattern is sensed by polarity sensitive photocells 18 and 19. The photocells transmit a signal depending on the light intensity on each photocell through amplifiers 21 to a servomotor 22. This servomotor causes arm 20 carrying the photocells 18 and 19 to rotate if the signal from one photocell is not equal to the signal from the other photocell. Thus, the photocells 18 and 19 carried on arm 20 rotate on a second shaft 23 to straddle the interference pattern, i.e., each revolving photocell seeks to receive the same lighting effect as the other which lighting effect is located at a point midway between the two bits which coincide and the two bits which are side by side. As one bit on the rotating disk moves to an adjacent space, the shadow effect speeds through 360°. If the ratio of bits between the stationary disk and the rotating disk is $n$ plus one, the shadow effect will rotate in the same direction as the rotating disk. If the ratio is reversed, the shadow effect will rotate counter to the disk rotation. The ratio of motion comparable to gear ratio is based on the number of bits in the rotating disk. Thus, with 24 bits on the rotating disk and 25 or 23 bits in the stationary disk, the ratio of shadow rotation to disk rotation is 24 to 1. As the photocells follow the shadow effect or rather the photocell sensing means straddle the rotating light and dark areas, second shaft 23 will turn at a speed of $n$ times the speed of first shaft 12. Intermediate to photocells 18 and 19 are rotational direction sensing means, e.g., a third stationary photocell 24 whose function is to sense the rotational direction of photocells 18 and 19. Past the photocells on shaft 23 is located a fine disk 25 which will furnish to its resolution the angular deviation within the one bit angle of the coarse digital encoder disk 11. With a resolution of $2^{10}$ in the coarse digital encoder disk, $2^{10}$ spokes in the fixed shadow disk, $2^{10-1}$ spokes in the rotating shadow disk and $2^{10}$ resolution in the fine disk, an ultimate resolution of $2^{20}$ can be achieved. If the first disk 11 is a Baldwin 10-bit BCD Gray code wheel, conversion from Gray binary coded decimal to straight decimal is done in a decoder 26, known in the art. To obtain a digital output useful with a straight binary coded decimal obtained from first disk 11, i.e., the Baldwin 10-bit BCD Gray code wheel, the second encoder 25 might be a Librascope 4-digit, 14 bits BCD device of the "V" double brush type. The output of this encoder must be passed through some form of antiambiguity circuitry 27 before it can be used as a binary coded decimal parallel number to be tacked on the low order portion of the decoder output 26 in a register 28. In the V brush anti-ambiguity circuit 27, there is a high and low brush for any one binary order $2^i$ but only one brush will be interrogated. The decision as to which shall be read is a function of the previous ordered reading. Starting with any order $i$, the upper or leading brush at $j$ will be gated out if the reading at $2^i$ was a "one." If the reading at $2^i$ were a "zero" the low or lagging brush will be sent to the register 28. This continues until the entire disk encoder 25 is scanned and neglecting any transfer time, all bits of the output can be had simultaneously. The cyclic or Gray code is one which changes only one unit in going from one number to the next highest or lowest number. The logical circuit to accomplish this is an "unequals" gate where the detection of $(Bn)$ $(Gn-1)'$ V $(Bn)'$ $(Gn-1)$; $Bn$ being a binary number and $Gn$ a Gray number, is performed.

If accuracy to a resolution of one part per million is not required, the simplest may to construct the disks depicted in the drawing is to draw two very large disks, some two or three feet in diameter. This will provide some six to ten feet of circumference on which it is possible to carefully lay out $n$ and $n$ plus one bits, indicating the center of a cross. The disks so drawn are then carefully photographed and reduced to a desired size. Precision is important since reduction in size does not reduce angular errors.

As illustrated in the drawing the vernier need not be disks. In many cases it may be advantageous to provide a pair of telescoped concentric hollow cylinders 29 and 30. The inner cylinder 29 is preferably the rotating cylinder and the outer cylinder 30 the stationary cylinder. A lamp 31 is provided around cylinders and photocells 33 are provided under the bits 34 over the cylindrical axis 32. The photocells are mounted on a horseshoe 35. Close clearance is required between the cylinders to minimize errors due to eccentricity in positioning the cylinders. Because of the fact that the bits 34 are all rectangular, greater precision is possible. However, a cylindrical vernier is more difficult to construct as the simple expedient of making a large disk and reducing the size photographically is not possible with a cylindrical vernier.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a device for converting cyclic binary numbers on a code disk to straight binary numbers; a vernier for furnishing an analogue resolution between positions on said code disk, comprising in combination, a shaft on which said code disk is affixed; a pair of axially aligned transparent circular means disposed around said shaft so that said shaft passes axially therethrough, one stationary and one rotatable by said shaft; a plurality of radially aligned bits around each of said circular means, said bits being of identical areas, equally spaced apart, one of said circular means having $n$ bits, the other having $n$ plus one; a light source disposed so as to pass light through said circular means between said bits; rotatable mounting means opposed to said circular means; two photocell sensing means responsive to said light mounted at opposed ends of said mounting means adapted to provide a varying signal depending on the intensity of said light; a servomotor receiving said photocell signal causing said rotatable mounting means to turn whenever the signal from said photocell sensing means are of different intensity; a circular position indicating means rotatable by the rotation of said mounting means; directional sensing means disposed to sense the rotational direction of said rotatable circular means; a decoder and counter furnishing a straight binary number from said cyclic binary number on said code disk; an antiambiguity circuit receiving the output of said circular position indicating means; and a register registering said straight binary number from said counter, and applying thereto said fractional number provided by the antiambiguity circuit in the phase indicated by said directional sensing means.

2. A device as claimed in claim 1, said circular means being a pair of axially opposed disks.

3. A device as claimed in claim 1, said circular means being a pair of telescoped concentric cylinders.

4. A device as claimed in claim 1, said stationary circular means having $n$ bits.

5. A device as claimed in claim 1, said stationary circular means having $n$ plus one bits.

References Cited in the file of this patent

UNITED STATES PATENTS

| | | |
|---|---|---|
| 2,747,797 | Beaumont | May 29, 1956 |
| 2,950,470 | Jones | Aug. 23, 1960 |